United States Patent
Tabares

(10) Patent No.: US 10,187,356 B2
(45) Date of Patent: Jan. 22, 2019

(54) CONNECTIVITY BETWEEN CLOUD-HOSTED SYSTEMS AND ON-PREMISES ENTERPRISE RESOURCES

(71) Applicant: Citrix Systems, Inc., Fort Lauderdale, FL (US)

(72) Inventor: Modesto Tabares, Weston, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 200 days.

(21) Appl. No.: 15/358,806

(22) Filed: Nov. 22, 2016

(65) Prior Publication Data

US 2018/0145950 A1    May 24, 2018

(51) Int. Cl.
*H04L 29/06*    (2006.01)
*H04L 29/12*    (2006.01)

(52) U.S. Cl.
CPC ...... *H04L 63/0272* (2013.01); *H04L 61/1511* (2013.01); *H04L 61/2514* (2013.01); *H04L 61/2592* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 7,516,174 B1* | 4/2009 | Tashjian | H04L 12/4641 455/403 |
| 9,032,092 B1* | 5/2015 | Sinn | H04L 61/00 709/222 |
| 2004/0073704 A1* | 4/2004 | Paunikar | H04L 29/12367 709/245 |
| 2004/0225895 A1* | 11/2004 | Mukherjee | H04L 12/4633 726/15 |
| 2011/0235508 A1* | 9/2011 | Goel | H04L 47/125 370/230 |
| 2014/0007218 A1* | 1/2014 | Rao | H04L 63/0272 726/13 |
| 2014/0258446 A1* | 9/2014 | Bursell | G06F 15/177 709/217 |
| 2015/0124827 A1* | 5/2015 | Rangaraman | H04L 12/4666 370/392 |
| 2016/0087940 A1* | 3/2016 | Miller | G06F 9/45558 726/15 |
| 2016/0277359 A1* | 9/2016 | Karunakaran | H04L 61/2514 |
| 2017/0012875 A1* | 1/2017 | Chang | H04L 45/745 |
| 2018/0034663 A1* | 2/2018 | Miller | G06F 9/45558 |

* cited by examiner

*Primary Examiner* — Michael R Vaughan
(74) *Attorney, Agent, or Firm* — Fox Rothschild LLP; Robert J. Sacco; Carol E. Thorstad-Forsyth

(57) ABSTRACT

Connectivity required for cloud computing services is provided by an SSL/TLS-based VPN client computer system operatively connected to a customer network of a cloud service customer. The VPN client instantiates an SSL/TLS-based VPN tunnel with an SSL/TLS-based VPN server operatively connected to a provider network of a cloud services provider. The VPN client facilitates digital data communications with one or more computing resources comprising the customer network by using a reverse network address translation (RNAT).

20 Claims, 7 Drawing Sheets

CONNECTIVITY BETWEEN CLOUD-HOSTED SYSTEMS AND ON-PREMISES ENTERPRISE RESOURCES

BACKGROUND

Statement of the Technical Field

The technical field of this disclosure concerns cloud hosted computing, and more particularly concerns methods and systems for implementing connectivity between cloud hosted computing systems and on-premises enterprise resources.

Description of the Related Art

There is a growing interest among business enterprises in offloading responsibility for certain computing functions. This interest is driving demand for cloud based computing services which are made available via the Internet. More particularly, a cloud computing provider makes available to its customers, certain servers and/or software, so that the customer may focus on other aspects of its business. But cloud-based computing services often require a degree of connectivity between enterprise servers operated by the customer and the computing resources that are made available by the cloud computing provider. Security concerns dictate that such connectivity is implemented in a way which ensures third parties cannot gain access to the information and data which is flowing between the enterprise servers and the cloud-based entity.

One approach for implementing the secure connectivity is a virtual private network or VPN. A VPN allows two computer entities to securely communicate through a computer network (e.g. the Internet) which is not otherwise trusted. Various types of VPN are known to rely on one of several different existing protocols to provide encryption. For purposes of providing connectivity between enterprise resources and cloud-based services, a network-based VPN is commonly used. For example, an Internet Protocol security (IPsec) tunnel-based communication session can be established for this purpose. The IPsec communication session functions by authenticating and encrypting each IP packet of a communication session. In the IPsec session, communications are usually carried out between a pair of single IP addresses which are configured by an administrator.

SUMMARY

Embodiments concern methods and systems for providing a customer network with connectivity required for cloud computing services. The method involves instantiating an SSL/TLS-based VPN tunnel between an SSL/TLS-based VPN client computer system operatively connected to a customer network of a cloud service customer, and an SSL/TLS-based VPN server operatively connected to a provider network of a cloud services provider. Digital data communications are facilitated between the SSL/TLS-based VPN server and one or more computing resources comprising the customer network of the cloud services customer by using a reverse network address translation (RNAT) at the SSL/TLS-based VPN client computer system.

The RNAT is used to selectively modify one or more first data packets received from the provider network to change the source address from a network address of a first computing entity in a private address space of the provider network, to a predetermined network address in a private address space of the customer network. For example, the predetermined network address can be the address of the SLS/TLS-based VPN client computer system. The RNAT is also used to selectively modify one or more second data packets received from a second computing entity in the private address space of the customer network to change the destination address contained therein. The destination address is changed from the predetermined network address in the private address space of the customer network, to the network address of the first computing entity in the private address space of the provider network.

The system for providing a customer network with connectivity required for cloud computing services, comprises an SSL/TLS-based VPN client computer system operatively connected to a customer network of a cloud service customer, and configured for carrying out the method described above.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
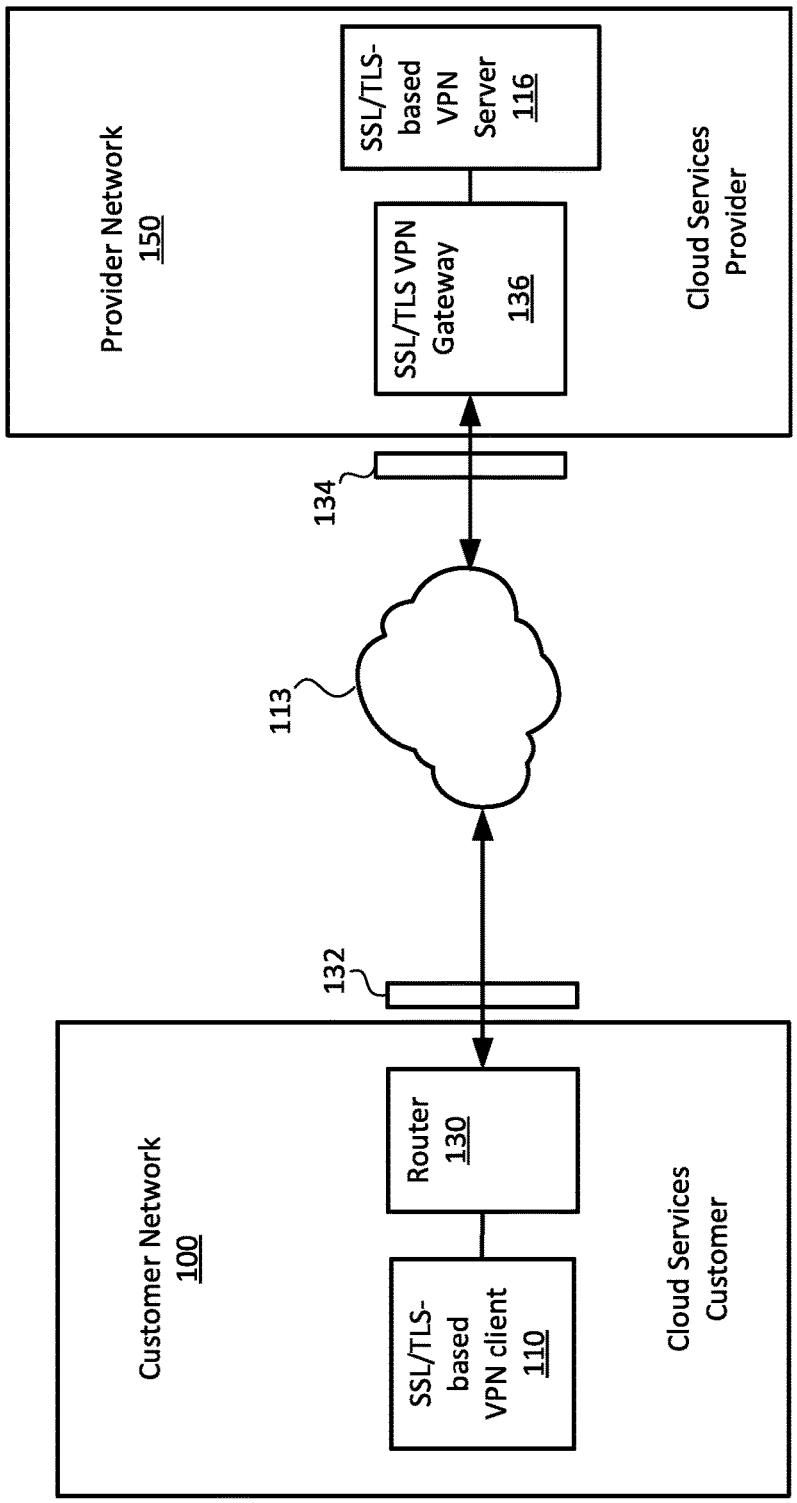
FIG. 1 is a simplified block diagram that is useful for understanding an interaction between a SSL/TLS based VPN client on a private network of a cloud computing services customer, and a SSL/TLS based VPN server on a cloud services provider network.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Cloud computing services commonly require connectivity to enterprise servers operated by the cloud computing customer. These enterprise servers can be located at the customer's premises and/or at a remote customer location.

However, in each case a secure computer network connection must be provided between the computing resources operated by the customer (e.g. at the customer premises) and the computing resources provided by the cloud computing provider. Various conventional approaches are used for implementing such connectivity. For example, some large entities may have dedicated network connections for this purpose. But the most common solution involves the establishment of an IPSec VPN tunnel between the cloud-based computing services and the customer's on-premises network.

The use of an IPsec VPN tunnel has been shown to work well in the foregoing scenario; but it can also present certain practical challenges. These practical challenges can sometimes discourage enterprise customers from moving forward with implementing a cloud-based computing service solution. For example, establishing an IPsec VPN tunnel between a cloud based entity and the customer's on-premises network resources can require the customer to (1) obtain and deploy an IPSec endpoint server (if they do not already have one), and (2) expose an IP endpoint outside their existing private network firewall. The implementation of the IPsec VPN tunnel can further require the customer to (3) update their network and routing configuration to enable IP traffic to be routed to and from the cloud-based resources. These steps usually require considerable technical investment on the part of the enterprise customer. They may also require a lengthy internal governance and approval process which is inconvenient and burdensome for information technology (IT) managers.

A connectivity solution disclosed herein eliminates all of the foregoing major complexity points involved with an IPsec tunnel and therefore makes it more convenient for an enterprise customer to adapt to a cloud-based provider solution. The secure network connection between the customer enterprise server resources and the cloud network provider servers is implemented by using a combination of a Secure Sockets Layer (SSL) or Transport Layer Security (TLS) based VPN tunnel and a reverse NAT (RNAT) at the client endpoint. With this combination, the complexities of IPsec are avoided, while enabling full IP-level connectivity from cloud-based systems and workloads to customer enterprise on-premises computing resources.

Referring now to FIG. 1, the connectivity solution disclosed herein concerns a customer network 100 which is associated with a cloud service customer enterprise, and a provider network 150 as may be implemented by a cloud services provider. Customer network 100 can be disposed at the premises of the cloud service customer enterprise and the customer network may therefore comprise a Local Area Network or LAN within a distinct geographical area such as an office or a commercial establishment. Similarly, customer network 100 can be disposed at the premises of the cloud service provider enterprise and may comprise a Local Area Network or LAN within a distinct geographical area such as an office or a commercial establishment. As such, each of the customer network 100 and the provider network 150 are private networks.

As shown in FIG. 1, entities comprising customer network 100 (including SSL/TLS-based VPN client 110) can access a public network 113 (such as the Internet) through a router 130 which is provided as part of the customer network. The router 130 will have a private IP address in the address space of the customer network 100. But the router is also connected to the Internet with a public IP address assigned by an Internet service provider. Accordingly, entities in customer network 100 (such as SSL/TLS-based VPN client 110) can communicate with entities outside customer network 100 by communicating through router 130. The VPN client 110 can comprise a server computer system.

Customer network 100 also includes a firewall 132. Firewalls are well known in the art and therefore will not be described here in detail. However, it will be understood that the firewall 132 is a hardware or software based security system that controls traffic into and out of the customer network 100 based on a set of rules. As such, firewall 132 can be integrated into the router 130 or may exist as a separate hardware element. Provider network 150 can include a firewall 134 similar to firewall 132.

The provider network 150 includes an SSL/TLS-based VPN server 116 which can establish an SSL/TLS based VPN connection with SSL/TLS-based client 110 in customer network 100. The VPN client can comprise a dedicated client server which is provided for this purpose on the customer network 100. The VPN connection can be established through public network 113 (which may be the Internet).

As is known, SSL is a protocol that provides privacy and data integrity between two communicating software applications, thereby allowing data to be securely exchanged between two software application entities across a public network, such as the Internet. SSL has evolved into a newer more secure protocol known as Transport Layer Security (TLS) which now largely supersedes the SSL protocol. For convenience, VPN tunnels which are designed to use either SSL or TLS protocols shall be referred to herein as SSL/TLS-based VPN tunnels. The TLS protocol is comprised of two layers which include the Handshake Protocol and the Record Protocol. The Handshake Protocol involves a process by which the VPN server and client can authenticate each other, select encryption algorithms, and select cryptographic keys that will be used during the VPN session. Once this part of the process is complete, the Record Protocol provides the necessary connection security during the VPN session.

SSL/TLS based VPN tunnels are known in the art and therefore will not be described here in detail. However, it should be understood that the process generally involves fragmenting application data from a software application, and then compressing and encrypting the data. The encrypted data can then be communicated across a public network as data contained within a conventional TCP/IP data packet. When the TCP/IP packet is received at its destination the data contained in the TCP/IP packet is decrypted and decompressed.

The customer network 100 and provider network 150 will now be described in further detail in relation to FIG. 2. It may be noted that in FIG. 2, certain elements shown in FIG. 1 (such as routers and firewalls) are intentionally omitted so as to avoid obscuring the various embodiments.

Figure 2:
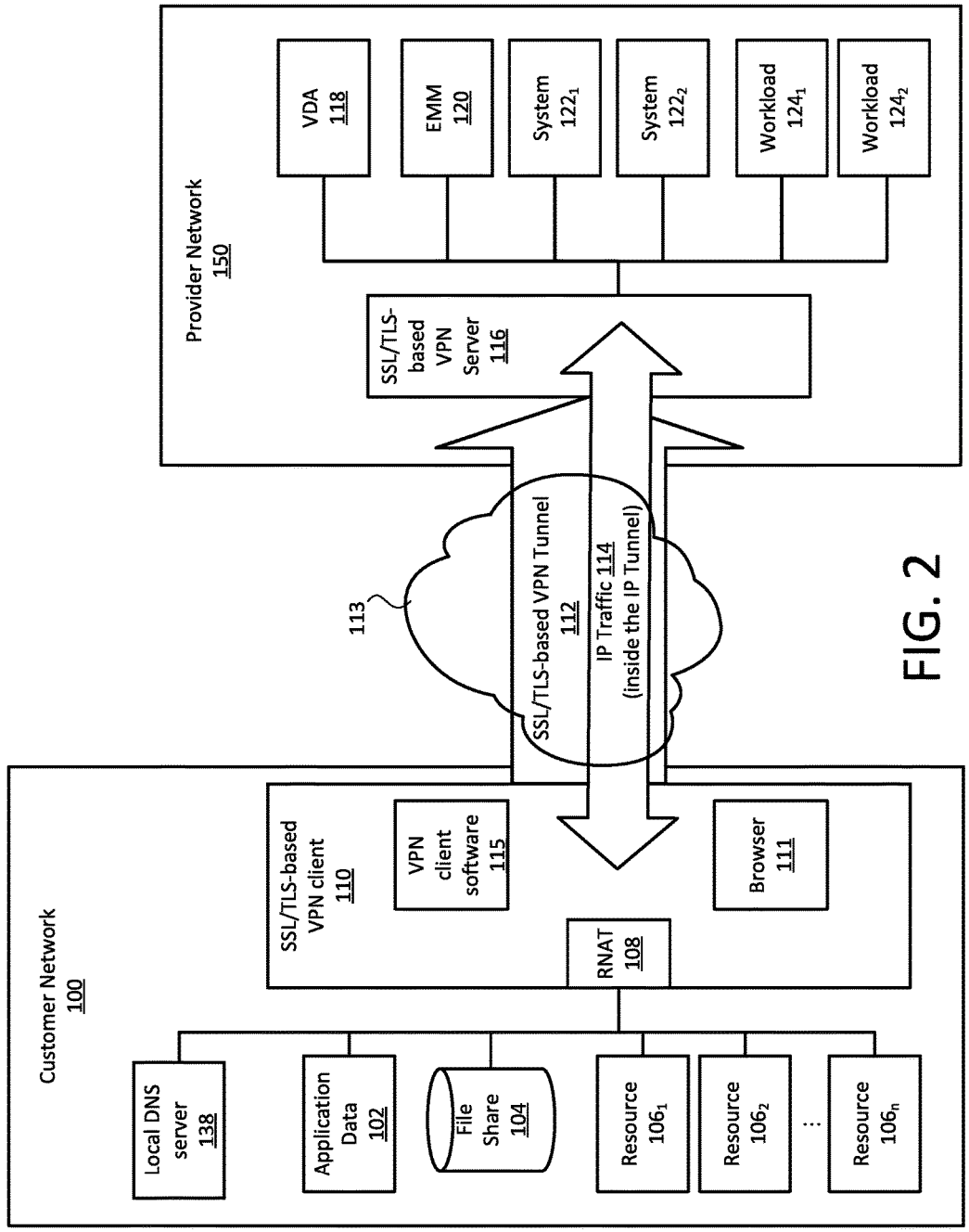
FIG. 2 is a block diagram which illustrates the customer network and the provider network of FIG. 1 in greater detail.

As shown in FIG. 2, the customer network 100 includes computing resources $106_1$, $106_2$, . . . $106_n$. The computing resources can include client computers, servers and/or other network appliances which have a private IP address in the address space of the customer network 100. Other components comprising the customer network 100 can include data storage device 102 containing application data, and file share data storage facility 104. In order to facilitate the network connectivity disclosed herein the customer network 100 can also include an RNAT 108.

The cloud services provider network 150 includes various systems and software applications to facilitate the cloud services described herein. For example, the provider network 150 can include one or more virtual desktop access (VDA) servers 118 which facilitate remote virtual desktop access for enterprise client users who are authorized to access the customer network 100 of a cloud services customer from off-premises locations. As is known, a virtual desktop access concerns software and systems which facilitate the separation of a user desktop environment (and associated application software) from the physical device that is normally used to access it. For example, remote desktop virtualization implementations can allow authorized enterprise users to log into an enterprise network from locations which are remote from the enterprise premises. VDA systems and implementations are well known in the art and therefore will not be described here in detail. However, it is sufficient to note that VDA is one cloud-based computing service which can be implemented by cloud services provider network 150.

The provider network 150 can also include an enterprise mobility management (EMM) server 120. The EMM server includes software applications to facilitate a secure network gateway for mobile devices needing to access computing facilities and data made from customer network 100. The EMM server and associated software can also facilitate various other mobility management functions involved in mobile device management. These functions can include mobile device management (MDM), mobile application management (MAM), mobile content management (MCM) for enterprise users operating mobile devices. An EMM implementation as described herein is commercially available from various vendors. For example, Citrix Corporation offers an EMM which is offered for sale under the tradename XenMobile.™

The provider network 150 can also include other types of computing resources associated with the cloud services. These computing resources are represented in FIG. 1 as server systems $122_1$, $122_2$. Each server system will have an associated workload which is represented in FIG. 1 as workloads $124_1$, $124_2$. Each workload consists of some portion of an application program running on a computer server system in the cloud services provider network 150, and will typically include some number of users who are interacting with the applications.

Referring now to FIGS. 1 and 2, the SSL/TLS-based VPN server 116 establishes an SSL/TLS-based VPN tunnel 112 with SSL/TLS-based VPN client 110. For convenience the SSL/TLS-based VPN server 116 may sometimes be referred to herein as "the VPN server". Similarly, the SSL/TLS-based VPN client 110 may sometimes be referred to herein as "the VPN client."

Figure 3:
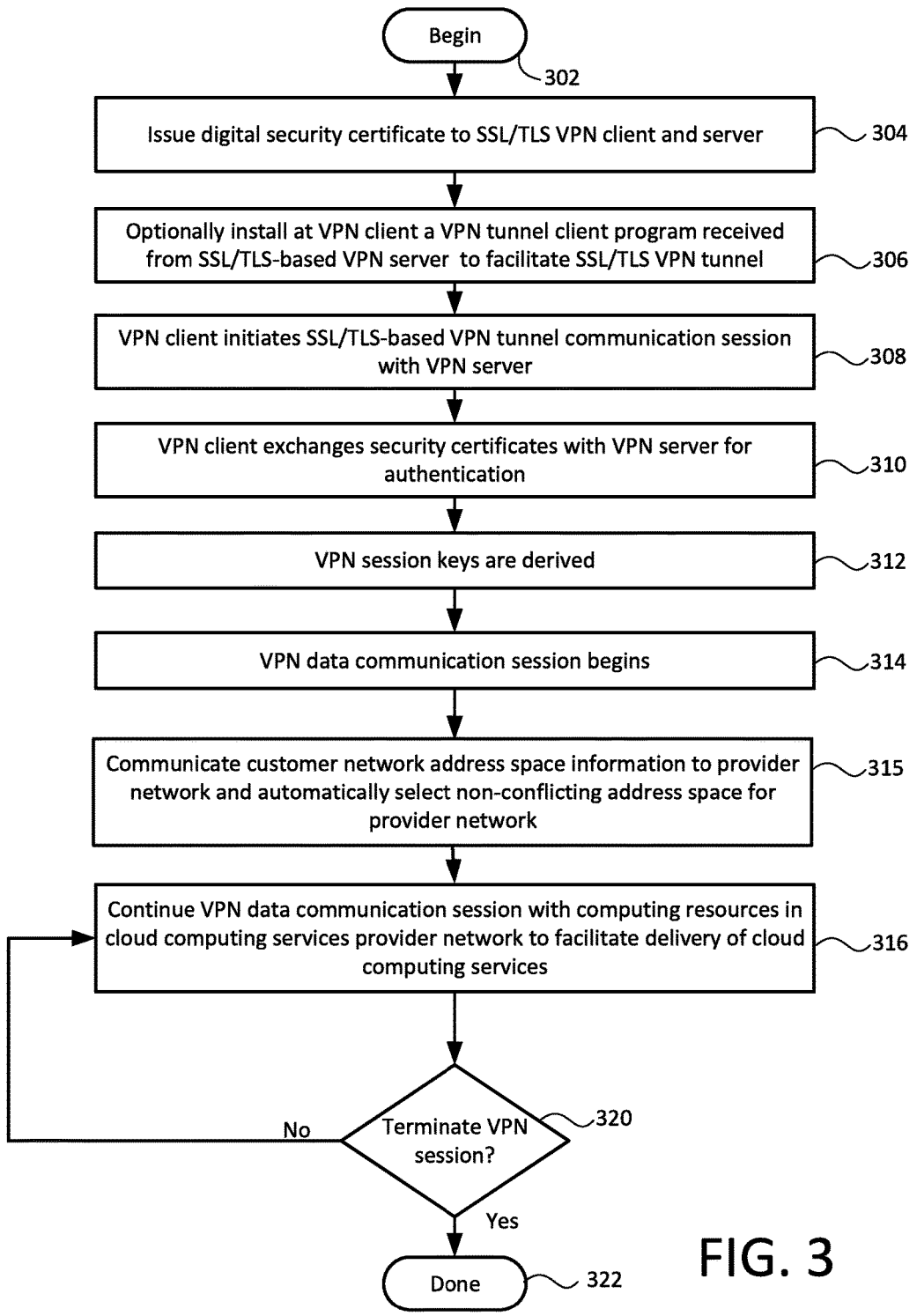
FIG. 3 is a flow chart that is useful for understanding a process which facilitates VPN connectivity between computing entities in a private network of a cloud computing services customer and computing entities in a cloud services provider network.

FIG. 3 is a flowchart that is useful for understanding the manner in which the VPN tunnel 112 is established. The process can begin at 302 and continues to 304 where a Certificate Authority issues a digital security certificate to the SSL/TLS VPN client (110) and server (116). At 306, the VPN client 110 can optionally receive a VPN tunnel client program from the SSL/TLS-based VPN server 116. For example, the VPN tunnel client program can be a software plug-in for web browser 111 which is designed to facilitate the SSL/TLS VPN tunnel. A desktop agent (e.g., a Java applet or ActiveX control) can be downloaded to facilitate a VPN session as described herein. In other embodiments VPN client software 115 can be pre-installed on the VPN client 110, in which case there is no need to receive additional software from the SSL/TLS-based VPN server.

The process continues at 308, where the VPN client 110 and the VPN server 116 can begin an SSL/TLS-based VPN tunnel communication session in response to a request sent from the VPN client to the VPN server. This triggers a chain of events to set up the VPN tunnel. For example, at 310 the VPN client can exchange security certificates with the VPN server for authentication purposes. At 312 VPN session keys can be derived at the VPN client 110 and VPN server 116, after which the VPN session can begin at 314.

At 315 (or at some other point in the setup process) the VPN client can communicate to the provider network 150 information concerning the customer network address space that is currently in use. This information is then used at the provider network to select a non-conflicting address space for the provider network 150. For example, if the customer network 150 is utilizing private address space 10.0.0.x then a different private address space, such as 172.16.1.x can be selected for the provider network address space. This ensures that there will be no possible conflict between addresses assigned to the provider network and the customer network. The detection of customer network address space and the assignment of the provider network address space can be performed in a fully automatic manner as a process involving the VPN client software 115 and the VPN server 116. However, in some instances it can be desirable for an administrator at the provider network select and assign the provider network address space. As part of the setup process, the network administrator at the provider network can also assign to computing entities 118, 120, $122_1$, $122_2$, $124_1$, $124_2$ in the provider network a default DNS lookup address which corresponds to the address of local DNS server 138. The purpose of this step will become more apparent as the discussion progresses below.

The VPN session can continue at 316 with communications occurring between various computing entities in the client customer network 100 and computing entities in the cloud computing services provider network 150. During the communication session, IP data packets comprising IP traffic 114 are communicated across an unsecure network (e.g. the Internet) using the SSL/TLS-based VPN tunnel 112. Details of these communications are discussed below in greater detail. At 320 a determination is made as to whether to terminate the VPN session. For the cloud services connectivity described herein, it is advantageous to maintain the VPN tunnel 112 regardless of whether there is any live data traffic between provider network and the customer network. Accordingly, the VPN tunnel 112 can be a persistent tunnel which is maintained for a period of time of indefinite duration regardless of whether it is actively in use for cloud computing purposes. So, during times when the VPN tunnel is to be maintained (314: No), the process returns to 310 and the communication session continues. In some scenarios, data packets can periodically be communicated across the VPN tunnel to facilitate maintaining activity in the tunnel. If the VPN tunnel is to be terminated for some reason (314: Yes) then the process can end at 316.

An SSL/TLS tunnel VPN differs in several ways from an IPsec tunnel type VPN. These differences are important from the standpoint of an enterprise customer seeking to establish connectivity to cloud-based computing services. As is known, an SSL/TLS VPN utilizes SSL or TLS to provides a secure connection between web browsers and a network service through tunnels which operated in accordance with the SSL/TLS protocol. So an SSL/TLS tunnel VPN does not require the cloud services customer to deploy complex IPsec software at the customer network 100. Instead, an SSL/TLS based VPN server 116 can be provided as part of the cloud computing services provider network 150, where it functions as the foundation for the VPN tunnel 112.

On the client or customer side of the connection (i.e. at customer network 100), the SSL/TLS-based VPN is comprised of a server and web browser software 111, although a dedicated software application can also be used for this purpose. Commercially available web browsers already ubiquitously incorporate the necessary SSL/TLS functions for implementing the SSL/TLS-based tunnel VPN described herein. Accordingly, the SSL/TLS tunnel VPN on the client side can be implemented in a local VPN client 110 inside the customer network 100. This saves the cloud services customer from the necessity of installing and configuring IPsec client software on a client machine to establish the IPsec tunnel VPN.

Another advantage of the SSL/TLS tunnel VPN is that it does not require a customer to expose an IP endpoint outside their existing private network firewall. Since an SSL/TLS tunnel VPN is a web-based approach that allows communications to occur by utilizing a standard HTTPS protocol, the associated IP traffic can pass through almost any firewall. Accordingly, there is no need for the cloud computing services customer to expose an IP endpoint outside an existing customer network.

From the foregoing it will be understood that there are numerous advantages to utilizing an SSL/TLS-base VPN tunnel for cloud computing connectivity purposes. But IP traffic 114 transported through the VPN for delivery of cloud computing services will generally require communications between one or more entities at the customer network 100 and one or more entities of the provider network 150. For example, on the customer network side, the communications can involve computing resources $106_1$, $106_2$, . . . $106_n$, file share 104, local DNS server 138 and application data storage device 102. Data from these entities can be communicated to and from one or more of the components of the cloud services provider network 150. For example, the IP traffic 114 may be communicated to and from one or more of the VDA server 118, EMM server 120, system $122_1$, and/or system $122_2$ in support of the various cloud computing services. This presents a problem because customer network 100 and provider network 150 are separate private networks operating with separate address domains. So absent a manual reconfiguration of the routing tables in each network, the various computing entities in each network 100, 150 would lack the ability to communicate with computing entities in the other network.

It is desirable to avoid any need for reconfiguration of the routing tables at the customer network as this task is often a significant administrative obstacle when a potential customer seeks to utilize cloud computing services. So in order to facilitate the connectivity required for implementing the cloud computing services, embodiments employ certain additional features which will now be described in further detail.

In particular, a reverse network address translator (RNAT) 108 is provided at the client side of the SSL/TLS tunnel VPN. The operation of the RNAT is discussed below in detail. Further, each of the computing entities in the provider network 150 is assigned a default DNS server address corresponding to the local DNS server 138. The local DNS server 138 contains a lookup table which associates the names of various computing entities comprising customer network 100 with their associated network address. The advantages of this approach will now be described below with reference to FIG. 2.

Figure 4:
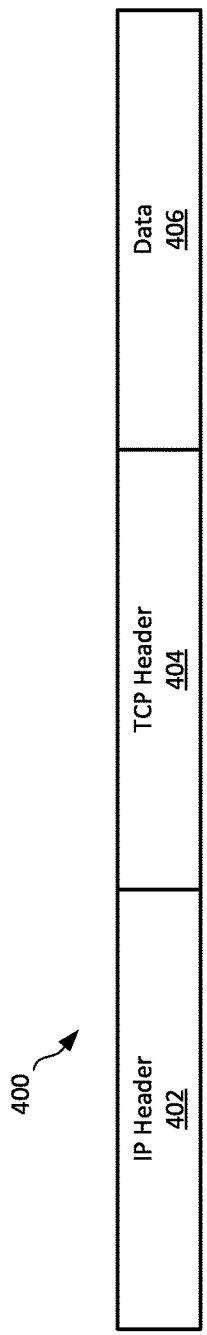
FIG. 4 is a simplified diagram which is useful for understanding a structure of a TCP/IP data packet.
Figure 5:
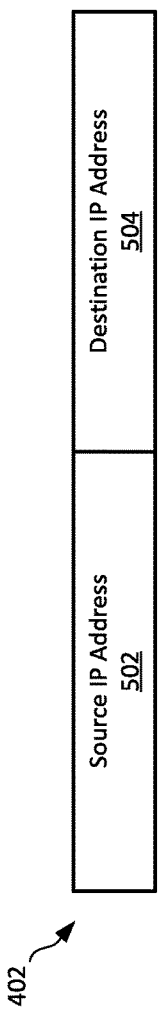
FIG. 5 is a simplified diagram which is useful for understanding a structure of an IP header in the data packet of FIG. 4.
Figure 6:
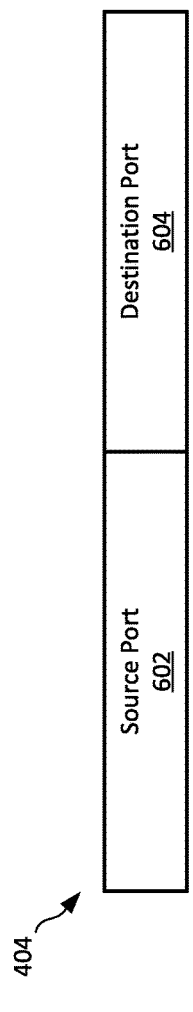
FIG. 6 is a simplified diagram which is useful for understanding a structure of a TCP header in the data packet of FIG. 4.

When a computing entity (e.g., VDA 118) located in provider network 150 needs to communicate with a computing entity (e.g., file share 104) located in customer network 100, it begins the communication session by first requesting the appropriate network address of such entity (e.g., the network address of file share 104) from the local DNS server 138 in the customer network. It does so by generating one or more TCP/IP data packets which comprise the DNS request message and sending them to the address of the VPN server 116. TCP/IP data packets are well known in the art and will not be described here in detail. However, FIG. 4 is a simplified diagram which shows an exemplary TCP/IP data packet to facilitate the discussion. The data packet 400 is comprised of an IP header 402, TCP header 404 and data 406. The IP header 402 is shown in more detail in FIG. 5 and includes information specifying a source IP address 502 and a destination IP address 504. The TCP header is shown in more detail in FIG. 6 and includes information specifying a source port 602 and a destination port 604.

The VPN server 116 encrypts and encapsulates these data packets in a conventional manner and communicates the request as VPN IP traffic 114 to VPN client 110. When received at VPN client 110, the DNS request is decrypted and de-encapsulated so the original DNS request message is recovered.

The RNAT 108 recognizes the destination address in the DNS request message as corresponding to a valid address within the address space of customer network 100, and routes the message to the local DNS server 138. But before doing so, it automatically changes the source address of the message so that it no longer specifies VDA 118 as the source address. Instead, the source address is changed so that it corresponds to the address of the VPN client. This step is necessary because the network address of VDA 118 does not exist within the address space of customer network 100. In contrast, the VPN client 110 does have a valid network address within the customer network 100. The RNAT 108 can also modify the DNS data request to assign a selected port number to the communication session involving VDA 118. As explained below, this port number is used by the RNAT 108 to correlate responsive communications from the local DNS server 138 with the original DNS request.

When the DNS request message is received in the local DNS server 138, it will look up the address of the requested computing entity. For example, if the DNS request concerned file share 104, then the local DNS server 138 would return the correct network address of the file share 104. The message specifying the requested address would be sent by the local DNS server 138 back to the VPN client 110 (since the VPN client was indicated as the source address of the DNS request message). Accordingly, the destination address of the response will specify the address of the VPN client. The response will also specify the port number information as previously indicated in the DNS request sent from VPN client. So when the response from the local DNS server is received at the VPN client 110, the RNAT 108 will use the port number information to recognize the response as corresponding to the DNS request which was originally sent by the VDA 118.

Once the DNS response message is received, the RNAT 108 will modify the data packet(s) to change the destination address. The destination address is changed from the address associated with RNAT 108 to the address associated with VDA 118. Thereafter, the messages is transported using VPN tunnel 112 to the VPN server 116. The VPN server will de-encrypt and de-encapsulate the VPN packets to retrieve the response messages from the local DNS server 138. Thereafter, the response message from the local DNS server will be routed within the provider network 150 to the entity which initiated the request, which in this example is the VDA 118. At this point, the VDA 118 will have the necessary address information it needs concerning the computing resource in the customer network 100 (in this example, the address of file share 104).

At this point in our example, the VDA 118 can begin communicating though the VPN tunnel 112 using one or more data packets which are addressed to file share 104. Computing entities in the provider network 150 will know that in order to send data packets to the address space of the customer network, they must communicate through VPN server 116 as their gateway or router. So, for example, any data traffic to be communicated from VDA 118 to an entity in the customer network (e.g., file share 104) is automatically communicated from the VDA 118 to the VPN server 116 for this purpose. Such data traffic from the VDA 118 will specify the address of the computing entity (e.g. file share 104) in the customer network 100 to which the packets are to be addressed.

When the VPN tunnel 112 is first established, the VPN client 110 will inform the VPN server 116 that it is aware of the address space associated with the customer network 100. So the VPN server 116 will know that there is a route through the VPN tunnel 112 to addresses within the address space associated with the customer network 100. So when the VPN server 116 receives data traffic from computing entities in provider network 150, and such data traffic specifies a destination address within the address space of customer network 100, the VPN server will automatically send that data traffic to the customer network over the VPN tunnel 112.

When these packets are received by the VPN client 110 the specified destination address (e.g. an address associated with file share 104) will be recognized as a valid address within the address space of customer network 100. So the VPN client can route or forward the received packets to the specified network address within customer network 100. Still, there is a problem which arises because the received packets will have a source address which corresponds to the address space of the provider network 150 (in this example, the source address of VDA 118). And the customer network has not been configured to recognize network addresses within the address space of provider network 150. So when entities (e.g. file share 104) within the customer network 100 attempt to reply by using the specified source address (which is on the provider network 150) as a destination address, such destination address will not be routable within the customer network 100.

Since it is desirable to avoid any reconfiguration of the routing tables within the customer network, the foregoing problem is overcome by alternative means. In particular, the RNAT 108 is configured so that it will change the source network address of the packets which originated from entities in the provider network 150. In particular, the source network address of such packets will be changed to the network address of the VPN client 110. The network address of VPN client 110 is a valid address which is routable within the customer network 100. Accordingly, to any of the computing entities within customer network 100 which receives such packets, it will appear that VPN client 110 was the source. So when an entity within the customer network (such as file share 104) responds to such data packets, they will respond using a destination address of the VPN client 110.

At any moment in time during a VPN tunnel session, a plurality of connections may be established between computing entities in the provider network 150 and computing entities in the customer network 100. The RNAT 108 differentiates packet communications corresponding to these different connections by selectively modifying a port number included in data packet communications which are received at VPN client 110 from each of the various computing entities within the address space of provider network 150. More particularly, this port number information is selectively modified by RNAT 108 to the selected value in the forwarded data packets which are communicated to computing entities within customer network 100. The modified value is also cross-referenced by the RNAT 108 to the address of computing entity in provider network 150 from which the packet originated. When computing entities within the customer network 100 reply to such data communications, they include the specified port number information contained in the corresponding data packets they have received. So when the data packets are communicated from the computing entities in the customer network 100 to the VPN client 110, the RNAT 108 can use the port number information to differentiate among the instantiated connections.

Moreover, the RNAT 108 will use the port number information to determine from its look-up table the computing entity within the provider network to which the connection corresponds. Thereafter, the RNAT 108 will change the destination address of the packets it has received from computing entities in customer network 100. The destination address will be changed from the address of the VPN client 110, to the address of a computing entity in provider network 150. The address of the computing entity in provider network 150 is determined based on the modified port number previously assigned to the connection by the RNAT. For example, in the exemplary communication session described herein, the RNAT would change the destination address to the address of VDA 118.

After the destination address has been modified in this way, the packets are communicated over VPN tunnel 112 to VPN server 116. The VPN server will de-encrypt and de-encapsulate the packets in a conventional manner. It will examine such packets to determine their destination address within the provider network 150. Thereafter the VPN server will route the packets to their appropriate destination address. In the example described herein, the packets from file share 104 would be forwarded by the VPN server 116 to the destination corresponding to the network address of VDA 118.

From the foregoing it will be appreciated that data packets received at the SSL/TLS-based VPN client 110 from VPN server 116 will have valid destination addresses within the address space of customer network 100. Likewise, packet communications in the customer network which are communicated to entities in provider network 150 will have valid destination addresses while being they are being communicated within the address space of the customer network 100. So there is no need for an administrator of the customer network to modify configuration and/or routing tables within customer network 150. Accordingly, this approach to implementing connectivity for cloud based computing services is simple and easy to implement from the standpoint of cloud computing customers.

Figure 7A:
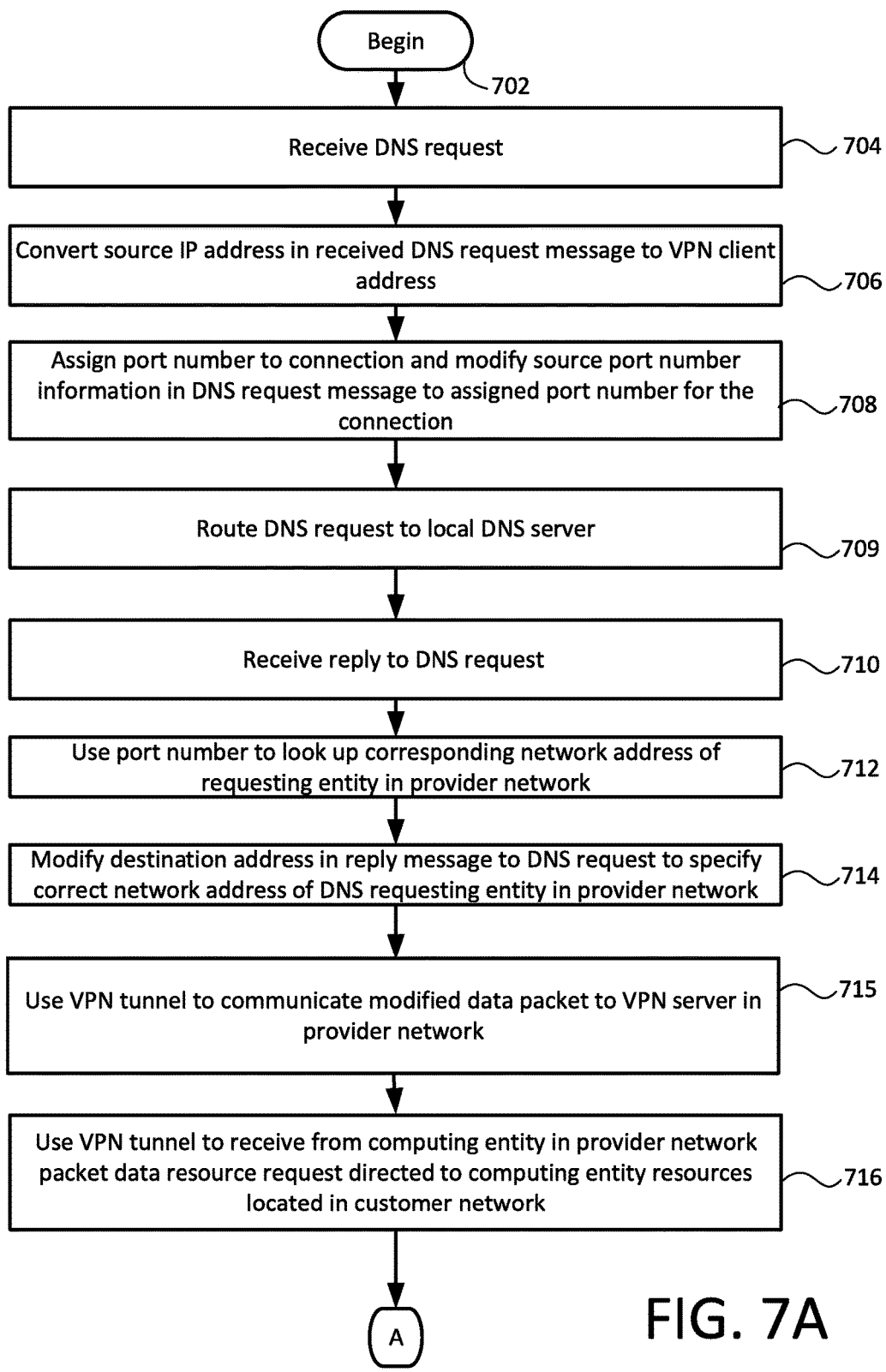
FIGS. 7A and 7B comprise a flowchart which is useful for understanding certain aspects of the embodiments disclosed herein.
Figure 7B:
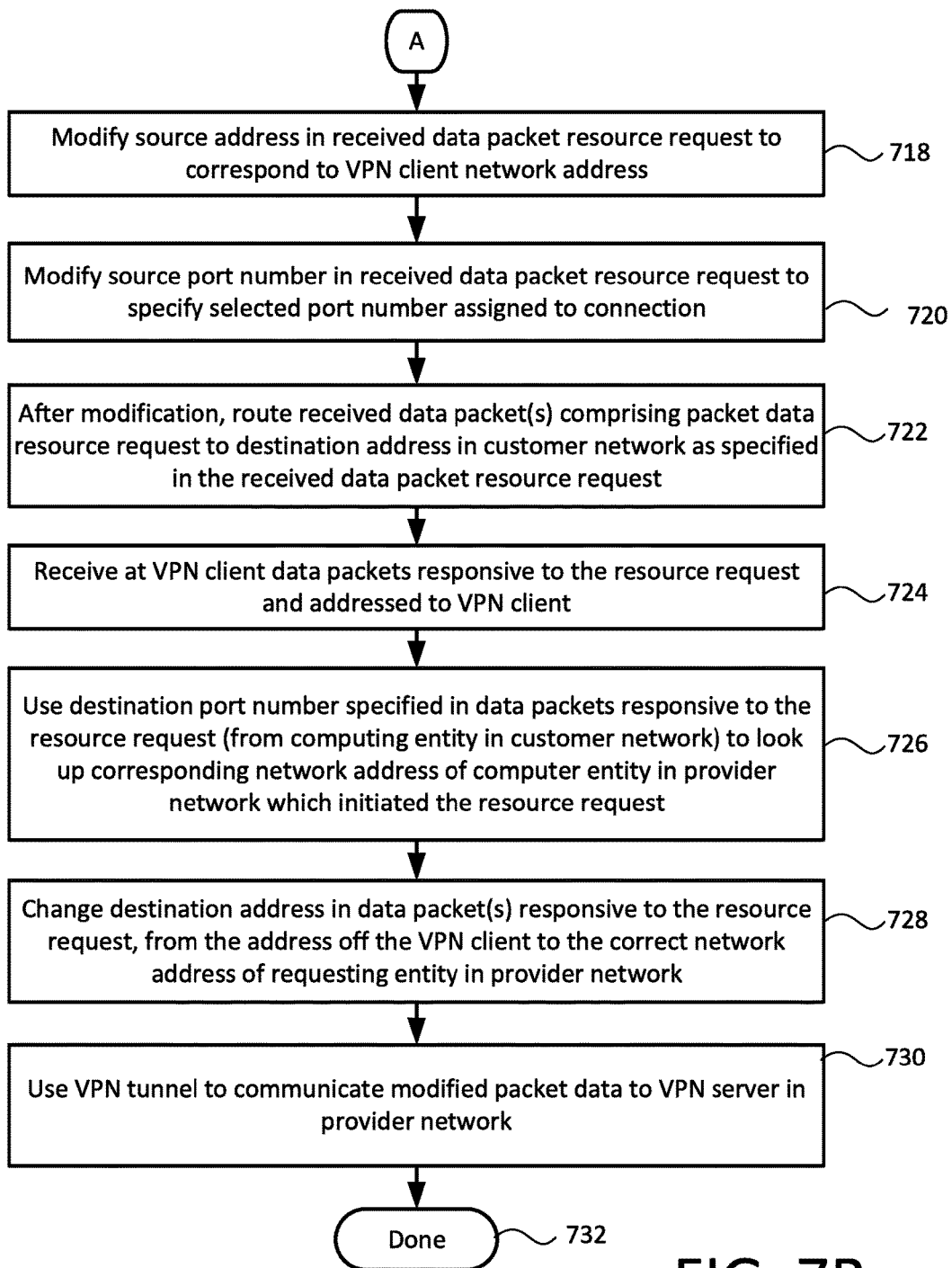

The foregoing operations performed at VPN 110 are illustrated in flowchart form in FIGS. 7A and 7B. The process begins at 702 and continues to 704 where the VPN 110 received the DNS request from VPN server 116. The VPN client 110 then converts the source IP address in the received DNS request message to the VPN client address at 706. The VPN client also assigns at 708 a port number to the connection and modifies the source port number information in the DNS request message to correspond to the assigned or selected port number for the particular connection. At 709 the VPN client routes the modified DNS request to the local DNS server. The VPN client receives a reply to the DNS request at 710. At 712, it uses the destination port number specified therein to look up the corresponding network address of the requesting entity in the provider network 150. This information is used at 714 to modify the destination address in the reply to the DNS request message to specify the correct network address of the DNS requesting entity (e.g. VDA 118) in the provider network. The VPN client then uses the VPN tunnel at 715 to communicate the modified packet to the VPN server 116.

Thereafter, the VPN client 110 will receive through the VPN at 716 a packet data resource request from a computing entity in the provider network 150 (e.g., VDA 118). This resource request will be directed to a computing entity (e.g. file share 104) located in the customer network 100. The process continues at 718 where the VPN client modifies the source address in the received data packet resource request. The source address is changed to correspond to the VPN client network address. At 720 the VPN client modifies the source port number in the received data packet resource request to specify the selected port number assigned to the connection with the entity in the provider network. Following these modifications, the VPN client will route the modified data packet at 722 to the specified destination address in the customer network.

A computing resource in the client network will respond to this request and this response will be received at the VPN client at 724. The VPN client at this point will use the destination port number specified in the received data packet(s) to look up a corresponding network address of the computer entity in the provider network 150 which initiated the request (e.g. VDA 118). Thereafter, at 728 the VPN client will change the destination address in the data packets from the address of the VPN client to the correct network address of the requesting entity in the provider network 150. At 730 the VPN client will use the VPN tunnel 112 to communicate the modified data packet to the VPN server in the provider network. Thereafter method can continue with additional processing or may terminate at 732.

Embodiments disclosed herein can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The methods described herein can be implemented on a computer system. The computer system can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. The phrase "computer system" shall be understood to include any collection of computing devices that individually or jointly execute a set (or multiple sets) of instructions to perform any one or more of the methodologies discussed herein.

Figure 8:
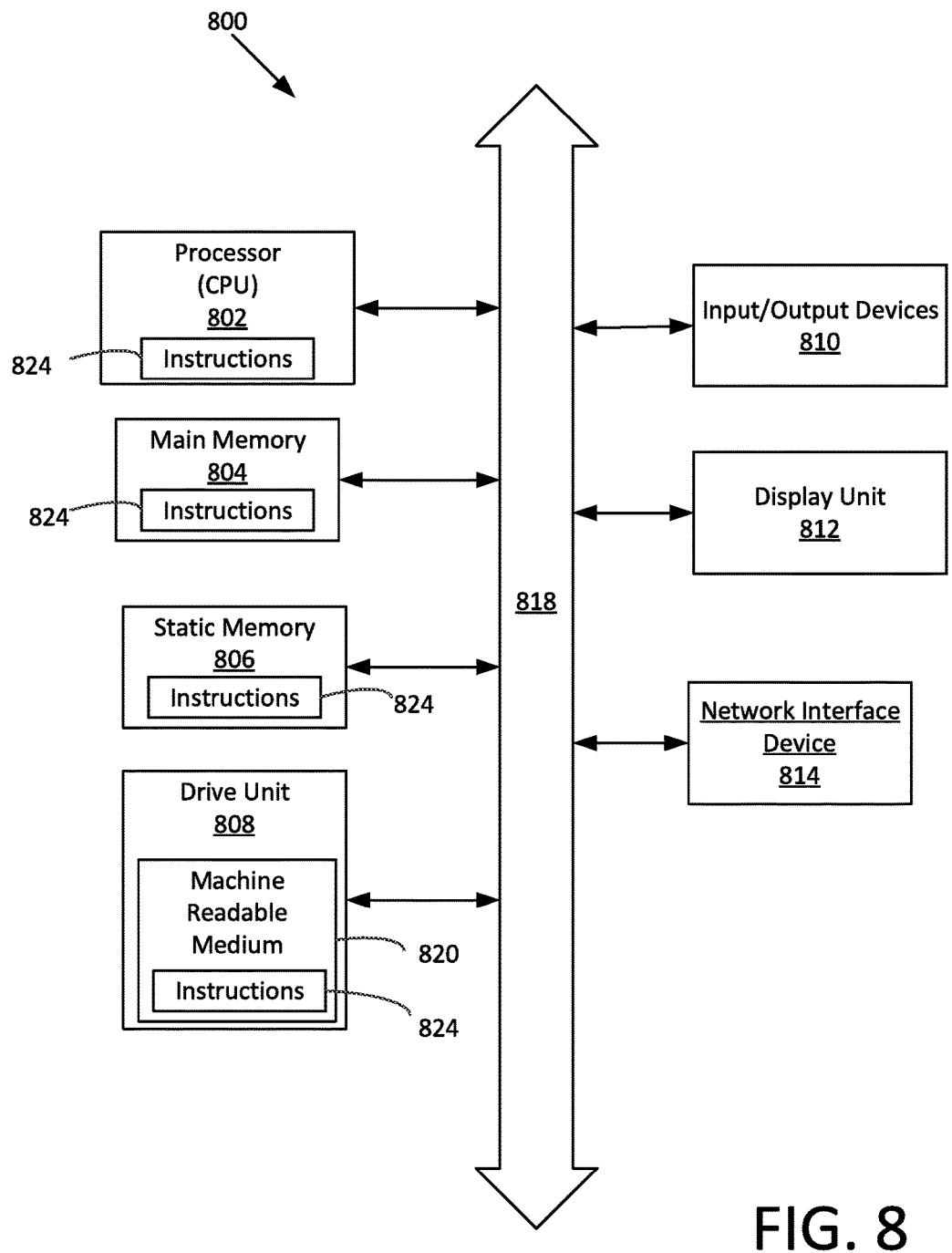
FIG. 8 is a block diagram that is useful for understanding an arrangement of certain computing entities located in a private network of a cloud computing services customer and a private network of a cloud computing services provider.

Referring now to FIG. 8, there is shown a hardware block diagram comprising an exemplary computer system 800. The system can include a set of instructions which are used to cause the computer system to perform any one or more of the methodologies discussed herein. In a networked deployment, the machine can function as a server or a router. In one or more embodiments, the exemplary computer system 800 can correspond to one or more of the SSL/TLS-based VPN server 116, the SSL/TLS-based VPN client and RNAT 108. Similar implementations can be used for computing resources $106_1$, $106_2$, . . . $106_n$, VDA server 118, EMM server 120 and systems $122_1$, $122_2$.

Computer system 800 can be operatively connected (networked) to other machines in a distributed environment to facilitate certain operations described herein. Accordingly, while only a single machine is illustrated it should be understood that embodiments can be taken to involve any collection of machines that individually or jointly execute one or more sets of instructions as described herein.

The exemplary computer system 800 is comprised of a processor 802 (e.g. a central processing unit or CPU), a main memory 804, a static memory 806, a drive unit 808 for mass data storage and comprised of machine readable media 820, input/output devices 810, a display unit 812 (e.g. a liquid crystal display (LCD), a solid state display, or a cathode ray tube (CRT)), and a network interface device 814. Communications among these various components can be facilitated by means of a data bus 818. One or more sets of instructions 824 can be stored completely or partially in one or more of the main memory 804, static memory 806, and drive unit 808. The instructions can also reside within the processor 802 during execution thereof by the computer system. The input/output devices 810 can include a keyboard, a mouse, a multi-touch surface (e.g. a touchscreen) and so on. The network interface device 814 can be comprised of hardware components and software or firmware to facilitate wired or wireless network data communications in accordance with a network communication protocol utilized by networks 100, 150.

The drive unit 808 can comprise a machine readable medium 820 on which is stored one or more sets of instructions 824 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 800 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

I claim:

1. A method for providing a customer network with connectivity required for cloud computing services, comprising:

instantiating an SSL/TLS-based VPN tunnel between an SSL/TLS-based VPN client computer system operatively connected to a customer network of a cloud service customer, and an SSL/TLS-based VPN server operatively connected to a provider network of a cloud services provider;

facilitating digital data communications between the SSL/TLS-based VPN server and one or more computing resources comprising the customer network of the cloud services customer by using a reverse network address translation (RNAT) at the SSL/TLS-based VPN client computer system since the customer network is unable to recognize network addresses within an address space of the provider network;

avoiding any reconfiguration of routing tables in the customer network by using the RNAT to selectively modify one or more first data packets received from the provider network to change the source address in a protocol header from a network address of a first computing entity in a private address space of the provider network, to a predetermined network address in a private address space of the customer network, and one or more second data packets received from a second computing entity in the private address space of the customer network to change the destination address contained the protocol header from the predetermined network address in the private address space of the customer network, to the network address of the first computing entity in the private address space of the provider network.

2. The method according to claim 1, wherein the predetermined network address in the private address space of the customer network is the network address of the VPN client computer system.

3. The method according to claim 1, further comprising automatically communicating from the SSL/TLS-based VPN client computer system to the SSL/TLS-based VPN server a range of network address values corresponding to the private address space of the customer network which are to be excluded from use in the provider network.

4. The method according to claim 3, further comprising automatically selectively modifying a configuration of the provider network so that the private address space of the provider network is exclusive of the private address space of the customer network.

5. The method according to claim 1, wherein there exist a plurality of computing entities in each of said customer network and the provider network, and the RNAT selectively modifies a source port number in each data message received from the plurality of computing entities in the provider network before forwarding said data message to one of the plurality of computing entities in the customer network.

6. The method according to claim 5, further comprising using a destination port number in a plurality of data messages received at the RNAT from the plurality of computing entities in the customer network to facilitate identification of each communication connection between one of the plurality of computing entities in the provider network and one of the plurality of computing entities in the customer network.

7. A method for providing a customer network with connectivity required for cloud computing services, comprising:

instantiating an SSL/TLS-based VPN tunnel between an SSL/TLS-based VPN client computer system operatively connected to a customer network of a cloud service customer, and an SSL/TLS-based VPN server operatively connected to a provider network of a cloud services provider;

facilitating digital data communications between the SSL/TLS-based VPN server and one or more computing resources comprising the customer network of the cloud services customer by using a reverse network address translation (RNAT) at the SSL/TLS-based VPN client computer system;

using the RNAT to selectively modify one or more first data packets received from the provider network to change the source address from a network address of a first computing entity in a private address space of the provider network, to a predetermined network address in a private address space of the customer network, and one or more second data packets received from a second computing entity in the private address space of the customer network to change the destination address contained therein from the predetermined network address in the private address space of the customer network, to the network address of the first computing entity in the private address space of the provider network; and receiving in the VPN client computer system at least one DNS request from the first computing entity in the private address space of the provider network, and addressed to a local DNS server in the private address space of the customer network, to retrieve a network address of a computing resource in the private address space of the customer network.

8. The method according to claim 7, further comprising automatically modifying the DNS request to change a source address contained therein from the network address of the first computing entity in the private address space of the provider network, to the network address of the VPN client computer system.

9. The method according to claim 8, further comprising operating the VPN client computer system to route the DNS request to the local DNS server in the private address space of the customer computer network.

10. The method according to claim 9, further comprising receiving at the VPN client computer system a response message to the DNS request from the local DNS server, and changing a destination address of the response message to a destination address of the first computing entity in the private address space of the provider network.

11. The method according to claim 10, further comprising routing the response message from the VPN client compute system to the provider network using the SSL/TLS-based VPN tunnel.

12. A system for providing a customer network with connectivity required for cloud computing services, comprising:

an SSL/TLS-based VPN client computer system operatively connected to a customer network of a cloud service customer, and configured for instantiating an SSL/TLS-based VPN tunnel with an SSL/TLS-based VPN server operatively connected to a provider network of a cloud services provider, facilitating digital data communications with one or more computing resources comprising the customer network by using a reverse network address translation (RNAT) at the SSL/TLS-based VPN client computer system since the customer network is unable to recognize network addresses within an address space of the provider network, and avoiding any reconfiguration of routing tables in the customer network by selectively modifying one or more first data packets received from the provider network to change the source address in a protocol header from a network address of a first computing entity in a private address space of the provider network, to a predetermined network address in a private address space of the customer network, and one or more second data packets received from a second computing entity in the private address space of the customer network to change the destination address contained a protocol header from the predetermined network address in the private address space of the customer network, to the network address of the first computing entity in the private address space of the provider network.

13. The system according to claim 12, wherein the predetermined network address in the private address space of the customer network is the network address of the VPN client computer system.

14. The system according to claim 12, wherein the SSL/TLS-based VPN client computer system is further configured to automatically communicate to the SSL/TLS-based VPN server a range of network address values corresponding to the private address space of the customer network which are to be excluded from use in the provider network.

15. The system according to claim 12, wherein there exist a plurality of computing entities in each of said customer network and the provider network, and the SSL/TLS-based VPN client computer system is configured to selectively modify a source port number in each data message received from the plurality of computing entities in the provider network before forwarding said data message to one of the plurality of computing entities in the customer network.

16. The system according to claim 15, wherein the SSL/TLS-based VPN client computer system is configured to use a destination port number in a plurality of data messages received from the plurality of computing entities in the customer network to facilitate identification of each communication connection between one of the plurality of computing entities in the provider network and one of the plurality of computing entities in the customer network.

17. A system for providing a customer network with connectivity required for cloud computing services, comprising:

an SSL/TLS-based VPN client computer system operatively connected to a customer network of a cloud service customer, and configured for instantiating an SSL/TLS-based VPN tunnel with an SSL/TLS-based VPN server operatively connected to a provider network of a cloud services provider, and facilitating digital data communications with one or more computing resources comprising the customer network by using a reverse network address translation (RNAT) at the SSL/TLS-based VPN client computer system to selectively modify one or more first data packets received from the provider network to change the source address from a network address of a first computing entity in a private address space of the provider network, to a predetermined network address in a private address space of the customer network, and one or more second data packets received from a second computing entity in the private address space of the customer network to change the destination address contained therein from the predetermined network address in the private address space of the customer network, to the network address of the first computing entity in the private address space of the provider network;

wherein the SSL/TLS-based VPN client computer system is configured to receive at least one DNS request from the first computing entity in the private address space of the provider network, and addressed to a local DNS server in the private address space of the customer network, to retrieve a network address of a computing resource in the private address space of the customer network.

18. The system according to claim 17, wherein the SSL/TLS-based VPN client computer system is configured to automatically modify the DNS request to change a source address contained therein from the network address of the first computing entity in the private address space of the provider network, to the network address of the VPN client computer system.

19. The system according to claim 18, wherein the SSL/TLS-based VPN client computer system is configured to route the DNS request to the local DNS server in the private address space of the customer computer network.

20. The system according to claim 19, wherein the SSL/TLS-based VPN client computer system is configured to receive a response message to the DNS request from the local DNS server, and change a destination address of the response message to a destination address of the first computing entity in the private address space of the provider network before routing the response message to the provider network using the SSL/TLS-based VPN tunnel.

* * * * *